United States Patent [19]

Hanai

[11] Patent Number: 5,433,989
[45] Date of Patent: Jul. 18, 1995

[54] MAGNETIC RECORDING MEDIUM AND PROCESS FOR PREPARING THE SAME

[75] Inventor: Kazuko Hanai, Kanagawa, Japan

[73] Assignee: Fuji Photo Film Co., Ltd., Kanagawa, Japan

[21] Appl. No.: 59,263

[22] Filed: May 11, 1993

[30] Foreign Application Priority Data

May 19, 1992 [JP] Japan ................. 4-150164

[51] Int. Cl.$^6$ .................................. G11B 5/00
[52] U.S. Cl. ..................... 428/141; 428/212; 428/332; 428/424.6; 428/425.9; 428/522; 428/694 BU; 428/694 BG; 428/694 BR; 428/694 BP; 428/900; 427/130; 427/557
[58] Field of Search ..... 428/694 B, 694 BG, 694 BU, 428/694 BP, 694 BR, 141, 212, 332, 425.9, 424.6, 522, 900; 427/130, 557

[56] References Cited

U.S. PATENT DOCUMENTS

| | | | |
|---|---|---|---|
| 3,366,505 | 1/1968 | Bisschops et al. | 117/62.2 |
| 4,711,819 | 12/1987 | Hanai et al. | 428/425.9 |
| 4,863,793 | 9/1989 | Ogawa et al. | 428/323 |
| 4,911,951 | 3/1990 | Ogawa et al. | 427/130 |
| 5,051,319 | 9/1991 | Kuse et al. | 428/694 |

Primary Examiner—Stevan A. Resan
Attorney, Agent, or Firm—Sughrue, Mion, Zinn, Macpeak & Seas

[57] ABSTRACT

Disclosed is a magnetic recording medium comprising, a non-magnetic support having thereon (i) a lower non-magnetic layer comprising a non-magnetic powder and a binder, and (ii) an upper magnetic layer comprising a ferromagnetic powder and a binder, wherein an extract, obtained by extracting with tetrahydrofuran the binder present in the area between the outer surface of the upper magnetic layer and a position 0.1 μm in depth from the outer surface, has a weight-average molecular weight of 15,000 or more, and wherein the reaction ratio of the curing agent reacted with the binder in the area between the outer surface of the upper magnetic layer and a position 0.1 μm in depth from the outer surface is at least 1.3 times as much as the reaction ratio of the curing agent reacted with the binder containing a polyurethane in the lower nonmagnetic and upper magnetic layers as a whole. Also disclosed is a process for making this magnetic recording medium.

5 Claims, No Drawings

MAGNETIC RECORDING MEDIUM AND PROCESS FOR PREPARING THE SAME

FIELD OF THE INVENTION

The invention relates to a magnetic recording medium, and more particularly to a magnetic recording medium which is excellent in running durability. It also relates to a process for preparing a magnetic recording medium which is excellent in running durability.

BACKGROUND OF THE INVENTION

Generally, in magnetic recording mediums obtained by dispersing ferromagnetic powder, a binder, a curing agent and other additives in an organic solvent, and coating the resulting coating composition on a nonmagnetic support and drying it, the magnetic layer thereof may be scraped as it slides by a magnetic head, etc. Accordingly, it is necessary that the magnetic layer is scarcely abraded and has excellent durability. To meet this need, it has been conventional to use a polyurethane binder which is excellent in abrasion resistance and toughness. Alternatively, the strength of the layer is increased by adding a curing agent to the binder and carrying out a crosslinking reaction, or an adsorptive polar group, such as a sulfonic acid group, a phosphoric acid group, a carboxyl group or a derivative thereof, is introduced into the binder to form adhesion between the ferromagnetic powder and the binder.

The sliding of the magnetic head on the magnetic recording medium is greatly affected by the binder present on the surface of the magnetic layer and in the vicinity of the surface thereof. Even when ferromagnetic powder is subjected to an adsorption treatment or when a crosslinking reaction of the binder is carried out, the low-molecular components in the uncrosslinked or unadsorbed binder migrate to areas in the vicinity of the surface of the magnetic layer. As a result, problems such as clogging of the head and staining of the guide pole are caused.

To cope with the problem, the present inventor has previously proposed that, for example, in a multi-layer structured magnetic recording medium comprising a non-magnetic support having thereon a lower magnetic layer and an upper magnetic layer, the binder used in the upper magnetic layer has a molecular weight which is higher than that of the binder used in the lower magnetic layer. As a result, the strengths of the layer can be increased and at the same time, running durability can be improved [see, JP-A-1-263925 (the term "JP-A" as used herein means an "unexamined published Japanese patent application")]. Further, JP-A-1-205723 discloses that in a magnetic recording medium having the structure described above, the amount of the polyisocyanate contained in the upper magnetic layer is larger than that of the polyisocyanate contained in the lower magnetic layer, to thereby improve running durability.

In the former method, however, since a binder having a high molecular weight is used, there is the problem that the magnetic layer is excessively hardened and as a result, there is a difficulty in satisfactorily calendering the magnetic layer. Additionally, since the molecular weight of the binder is originally too high, the ferromagnetic powder is poorly dispersed, and, as a result, good surface properties can not be obtained and it is difficult to obtain a high RF output.

In the latter method, since the amount of the polyisocyanate to be contained in the upper magnetic layer and the molecular weight of the binder to be reacted with the polyisocyanate must be properly controlled, there is the problem that it is difficult to prepare an upper magnetic layer having optimum hardness.

The problem of running durability in particular has become a serious problem with the development of higher-density recording and higher performance of the magnetic recording medium in recent years.

Accordingly, there is a need for an effective means for obtaining stable, good running durability in the magnetic recording mediums.

The present inventors have made studies with the view to solve the problems mentioned above. In the studies, materials by which the head was clogged and the reaction system of the resin component of the binder with the curing agent component in the magnetic layer were quantitatively analyzed by means of ESCA, FT-IR, EPMA, GPC, etc. As a result, an effective means of solving the above problems has been found.

SUMMARY OF THE INVENTION

An object of the present invention is to provide a magnetic recording medium which prevents clogging of the head and staining of the guide pole, is excellent in running durability and in the surface properties of its magnetic layer, has a high reproducing output, and is excellent in electromagnetic conversion characteristics.

Another object of the present invention is to provide a process for preparing the above-described magnetic recording medium.

The present invention provides in one aspect a magnetic recording medium comprising a non-magnetic support having thereon at least two layers of a lower non-magnetic layer comprising at least a non-magnetic powder and a binder, and an upper magnetic layer comprising at least a ferromagnetic powder and a binder. An extract, obtained by extracting with tetrahydrofuran the binder present in the area between the outer surface of the upper magnetic layer and a position 0.1 $\mu$m in depth from the outer surface, has a weight-average molecular weight of 15,000 or more. The reaction ratio of a curing agent reacted with the binder present in the area between the outer surface of the upper magnetic layer and a position 0.1 $\mu$m in depth from the outer surface is at least 1.3 times as much as the reaction ratio of the curing agent reacted with the binder containing a polyurethane present in the coated layers containing the lower non-magnetic and upper magnetic layers as a whole.

The present invention provides, in another aspect, a process for preparing a magnetic recording medium which comprises the steps of:

coating a non-magnetic coating composition containing at least a non-magnetic powder, a binder and a polyisocyanate on a non-magnetic support to form a lower non-magnetic layer;

simultaneously or successively coating a magnetic coating composition containing at least a ferromagnetic powder, a polyurethane having a polar group of a weight-average molecular weight of 5,000 to 50,000 and a polyisocyanate on the lower non-magnetic layer while the lower non-magnetic layer (hereinafter referred to as a lower layer or a non-magnetic layer) is still in a wet state; and drying the non-magnetic layer and the magnetic coating composition to obtain a magnetic recording medium comprising the non-magnetic support having thereon the non-magnetic layer and the magnetic layer, wherein the reaction ratio of the polyisocyanate reacted with the binder present in the area between the surface of the dried magnetic layer and a position 0.1 μm in depth from the outer surface of the magnetic layer is at least 1.3 times as much as the reaction ratio of the polyisocyanate reacted with the binder contained in the coated layers as a whole.

DETAILED DESCRIPTION OF THE INVENTION

The present invention is illustrated in more detail below.

In the present invention, the structural form of the binder, which has a direct effect on running durability, particularly the reaction system of a resin component with a curing agent component is specified quantitatively, the binder being present in the vicinity of the surface of the magnetic layer, that is, in the area between the outer surface of the magnetic layer and a position 0.1 μm in depth from the outer surface of the magnetic layer. The term "binder" as used herein refers to a high-molecular resin (or resin component) excluding a low-molecular curing agent (or curing agent component) which is capable of crosslinking with the binder, unless otherwise stated.

Namely, in the present invention, the binder formed by the reaction of the resin component of the binder with the curing agent component is specified for the area in the vicinity of the surface of the magnetic layer and for the whole of the magnetic layer. In other words, the frequency of the reaction between the curing agent component and the resin component in the vicinity of the surface of the magnetic layer is 1.3 times (in terms of probability) the frequency of the reaction between the curing agent component and the resin component in the coated layers as a whole and in turn in the entire magnetic layer. Thus, the binder formed by the reaction between the curing agent component and the resin component in the vicinity of the magnetic layer, that is, in the area between the outer surface of the magnetic layer and a level 0.1 μm in depth from the outer surface of the magnetic layer, has an average molecular weight which is higher than that of the binder formed in the whole of the magnetic layer. The present inventors have found that the problems associated with prior art can be solved and a magnetic recording medium having excellent running durability and good surface properties can be obtained when in addition to the above, the layer in the vicinity of the outer surface of the magnetic layer is extracted with tetrahydrofuran (THF), the extract of the binder has a weight-average molecular weight of 15,000 or more.

In the present invention, the reaction ratio of the curing agent reacted with the binder present in the area between the outer surface of the upper magnetic layer and a position 0.1 μm in depth from the outer surface is at least 1.3, preferably 1.3 to 2.2, times as much as the reaction ratio of the curing agent reacted with the binder containing a polyurethane present in the lower non-magnetic and upper magnetic layers as a whole.

In the present invention, the reaction ratio of the polyisocyanate reacted with the binder present in the area between the surface of the dried magnetic layer and a position 0.1 μm in depth from the outer surface of the magnetic layer is at least 1.3 times, preferably 1.3 to 2.2, as much as the reaction ratio of the polyisocyanate reacted with the binder contained in the coated layers as a whole.

In the present invention, unreacted or unadsorbed binder, which is present in the vicinity of the surface of the magnetic layer and conventionally causes staining of the head and the guide pole, is properly reacted with the curing agent to increase the molecular weight of the binder and to improve running durability. Further, since the molecular weight of the binder can be increased by the reaction between the resin component and the curing agent component, a resin component having a relatively low molecular weight can be used. Hence, the dispersibility of the ferromagnetic powder in the magnetic coating composition can be improved and the calendering of the magnetic layer can be improved. As a result, the smoothness of the surface of the magnetic layer can be improved. Accordingly, satisfactory electromagnetic characteristics can be obtained.

Further, in the present invention the flexibility of the whole of the magnetic layer and the whole of the coated layers can be maintained and head touch can be improved by setting the reaction percentage of the curing agent component.

In the magnetic recording medium of the present invention, the reaction ratio of the curing agent component or the existence ratio of the curing agent component reacted with the resin component in the whole of the coated layers or in the magnetic layer can be determined by various analytical methods. For example, such methods as ESCA, FT-IR, EPMA and GPC can be used either alone or in combination. A method for measuring the curing agent component wherein a polyisocyanate is used as the curing agent component is illustrated below by the way of example. It should be understood that the measuring method is not limited to the polyisocyanate, but can also be applied to other curing agent components. Namely, when the curing agent component is a polyisocyanate, a reaction between isocyanato group (—NCO) and the functional group of the resin component takes place. Accordingly, the reaction ratio can be measured on the basis of the N atom.

A magnetic recording medium is extracted with n-hexane at room temperature for 30 minutes, and the N/Fe present in the vicinity of the surface of the magnetic layer of the magnetic recording medium is determined by means of ESCA. Since the analysis depth by ESCA is very shallow (100Å or less), it is necessary to remove the lubricant layer on the surface of the magnetic layer. A higher fatty acid or an ester thereof on the coated layer, particularly on the surface thereof is removed by an extraction treatment with n-hexane to thereby uncover the ferromagnetic powder or the binder. Uncured curing agent is not dissolved in hexane.

Further, the magnetic recording medium used in the extraction treatment with n-hexane is drawn, and the whole of the coated layers is peeled off therefrom, thoroughly crushed and pelletized into 10 mmφ pellets. An N/Fe is determined from the pellets by means of ESCA.

The aforesaid ratio can be obtained by dividing the former (i.e., the N/Fe of the vicinity of the surface of the magnetic layer) by the latter (i.e., the N/Fe of the whole of the coated layers). ESCA is an abbreviation of Electron Spectroscopy for Chemical Analysis and has the same meaning as XPS and X-ray photoelectron spectroscopy. The measuring conditions are as follows.

Apparatus for ESCA: PHI-5400 MC (manufactured by ULBACPHI Co., Ltd.)
Conditions: 400 W (15 kV)
   Mg anode
   Measuring time: 10 minutes
   N/Fe: ratio of intensity of peak of 1S of N to intensity of peak of 2P3/2 of Fe.

When the ratio is less than 1.3, the ratio is too small to achieve the object of the present invention and running durability can not be improved, while when the ratio is larger than 2.2, the surface is hard and brittle and head touch becomes poor.

The measuring range of the N/Fe ratio in the vicinity of the outer surface of the magnetic layer is such that the upper limit thereof is usually a depth of 100Å at its maximum from the outer surface of the magnetic layer. Accordingly, the measurement by means of ESCA shows a distribution of N and Fe present in the vicinity of the outer surface of the magnetic layer. The magnetic recording medium is then cut into a thin piece in the form of a layer in the direction of the surface thereof by an ultramicrotome provided with a glass knife. A cut of 0.1 μm in depth from the surface of the upper magnetic layer is subjected to a measurement by means of ESCA, whereby the ratio of N/Fe present in the vicinity of the outer surface of the magnetic layer can be confirmed.

The weight-average molecular weight of an extract obtained by extracting the binder with tetrahydrofuran can be measured in the following manner, that binder being present in the area between the outer surface of the magnetic layer and a position of 0.1 μm in depth from the outer surface of the magnetic layer.

A layer of about 0.1 μm between the outer surface of the magnetic layer and a position of about 0.1 μm in depth from the surface of the magnetic layer is scraped off by an abrasive tape (#700). The resulting powder of the magnetic layer is extracted with tetrahydrofuran. The weight-average molecular weight of the soluble matter obtained by GPC can be determined from a calibration curve by means of spectrophotometry such as with a UV detector, the calibration curve being previously prepared by using polystyrene having a known molecular weight. An example of a suitable measuring device is the HLC-8020 manufactured by Tosoh Corp.

In the present invention, the weight-average molecular weight of the extracted resin obtained by the above measurement is preferably in the range of 15,000 to 60,000, more preferably 20,000 to 40,000. The binder extracted in the above measurement comprises the oligomers of the binder which is reacted with the curing agent and has a still solubility, as well as unreacted binder. It contains a very small amount of unreacted curing agent.

Accordingly, when the above requirements of the reaction ratio between the curing agent component and the resin component and the above extraction condition are met in the present invention, the low-molecular components of the binder present in the vicinity of the magnetic layer are eliminated as much as possible, and a binder having a high molecular weight is formed. As a result, the strength of the layer can be increased, and the dispersibility of ferromagnetic powder can be improved so that the surface properties of the magnetic layer allow the center line average surface roughness to be preferably 5.0 nm or below, more preferably 2 to 4 nm. The "center line average surface roughness" is worldwide used to express surface roughness and is defined by JIS B 0601.

The above definition for the reaction ratio of the curing agent component and the THF extract in the present invention (hereinafter referred to as the definition of the present invention) is a concrete useful index for choosing a blending ratio of the resin component of the binder and the curing agent component in the magnetic coating composition and in the non-magnetic coating composition or the molecular weight of the resin component.

The resin component in the non-magnetic component of the present invention may have a weight-average molecular weight of 5,000 to 50,000, preferably 10,000 to 30,000. The amount of the curing agent component contained in the non-magnetic composition is 10 parts by weight or more, preferably from 20 to 70 parts by weight, more preferably from 30 to 50 parts by weight, per 100 parts by weight of the resin component.

The resin component in the magnetic coating composition of the present invention may have a weight-average molecular weight of 5,000 to 50,000, preferably 10,000 to 30,000. The amount of the curing agent component contained in the upper magnetic layer is 10 parts by weight or more, preferably from 20 to 70 parts by weight, more preferably from 30 to 50 parts by weight, per 100 parts by weight of the resin component.

An example of the composition of the binder used in the coating compositions for the lower non-magnetic layer and the upper magnetic layer is the combination of a resin component comprising a polyurethane resin (i.e., having the same meaning as polyurethane), preferably polyurethane having a polar group, and a vinyl chloride copolymer resin with a polyisocyanate as the curing agent component.

Examples of effective means for meeting the requirements of the present invention include, but are not limited to, the following factors:

(1) The use of a wet-on-wet coating system as the coating means described in U.S. Pat. No. 4,844,946:

The upper magnetic layer is simultaneously or successively coated on the lower non-magnetic layer while the lower non-magnetic layer is still in a wet state. When the coating is conducted by this coating system, the curing agent component in the lower non-magnetic layer can easily migrate to the area in the vicinity of the surface of the upper magnetic layer, and hence the molecular weight of the resin component in the coating composition for the upper magnetic layer can be lowered, whereby the dispersibility of ferromagnetic powder can be improved.

Further, with the wet-on-wet coating system, the thickness of the magnetic layer can be further reduced.

(2) The choice of drying conditions:

For example, when a sharp temperature gradient is applied during drying, the migration of the curing agent component from the lower layer to the upper layer can be accelerated. Hence, a similar effect to that described above can be obtained.

(3) The choice of the blending ratio of the curing agent component in each of the coating compositions for the lower non-magnetic layer and for the upper magnetic layer:

A larger amount of the curing agent component can be contained in the lower non-magnetic layer when the above means (1) and (2) are applied (the ratio is as described above).

(4) The choice of a resin component and a curing agent component which are well compatible with each other:

The above-described means (1) to (3) become more effective when the means (4) is applied.

The binders which can be used in the present invention include a polyurethane having a polar group as the resin component. Any resin component which is reactive with the curing agent component can be used, so long as it has a functional group capable of forming a covalent bond with the functional group of the curing agent component.

When the curing agent component has an isocyanate group (—NCO group), examples of the functional group of the resin component include —OH, —COOH, —NH$_2$, —NH— and —NRH groups (wherein R represents an alkyl group).

A particularly preferred resin component which is reactive with the curing agent component is polyurethane.

Any conventional polyurethane structure can be used. Examples of the polyurethane structures which can be used in the present invention include polyester polyurethane, polyether polyurethane, polyether polyester polyurethane, polycarbonate polyurethane, polyester polycarbonate polyurethane and polycaprolactone polyurethane.

Trifunctional polyisocyanates are particularly preferred as the curing agent component.

When polyurethane as the reactive resin is used in combination with the polyisocyanate in the present invention, the number of the functional groups per molecular of polyurethane can be properly chosen from among the conditions described below.

Polyurethane having a glass transition temperature of from −50° to 100° C., an elongation at break of 100 to 2,000%, a breaking stress of 0.05 to 10 kg/cm$^2$ and a yield point of 0.05 to 10 kg/cm$^2$ can be preferably used in the present invention.

Vinyl chloride resins which can be preferably used in combination with polyurethane in the present invention may be reactive with the curing agent component and include conventional resins.

Examples of the vinyl chloride resins include polyvinyl chloride and copolymers of vinyl chloride with other comonomers such as at least one of vinyl acetate, vinyl alcohol, maleic acid and acrylic acid.

When the vinyl chloride resins are used as the reactive resin in combination with the polyisocyanate in the present invention, the number of the functional groups per molecule may be properly chosen from among the conditions of the present invention described below.

The proportion of the polyurethane based on the total amount of the binder is in the range of 10 to 80% by weight, preferably 20 to 60% by weight. When the amount is less than 10% by weight, sufficient durability can not be imparted.

The amount of the binder used in the lower non-magnetic layer and the upper magnetic layer of the present invention is in the range of preferably 10 to 40% by weight based on the amount of non-magnetic powder or ferromagnetic powder.

Examples of other resins which can be used as the resin component in the present invention include conventional thermoplastic resins, thermosetting resins, reactive resins and mixtures thereof.

The thermoplastic resins are those having a glass transition temperature of −100° to 150° C., a number average molecular weight of 1,000 to 200,000, preferably 10,000 to 100,000, and a degree of polymerization of 50 to 1,000. Examples of the thermoplastic resins include homopolymers and copolymers of vinyl chloride, vinyl acetate, vinyl alcohol, maleic acid, acrylic acid, acrylic esters, vinylidene chloride, acrylonitrile, methacrylic acid, methacrylic esters, styrene, butadiene, ethylene, vinyl butyral, vinyl acetal and vinyl ether; polyurethane resins; and various rubber resins. Examples of the thermosetting resins or the reactive resins include phenolic resins, epoxy resins, polyurethane curing type resins, urea resins, melamine resins, alkyd resins, acrylic reactive resins, formaldehyde resins, silicone resins, epoxy-polyamide resins, mixtures of polyester resins and isocyanate prepolymers, mixtures of polyester-polyols and polyisocyanates, and mixtures of polyurethanes and polyisocyanates.

The details of these resins are described in *Plastic Handbook* (published by Asakura Shoten).

Further, conventional electron beam-curable resins can be used in the lower or upper layer. Examples thereof and a process for preparing them are described in JP-A-62-256219.

A polyurethane having at least one polar group may be used as the resin component in the present invention. Examples of the polar group include —COOM, —SO$_3$M, —OSO$_3$M, —P=O(OM')$_2$, —O—P=O(OM')$_2$ (wherein M represents a hydrogen atom, an alkali metal or an ammonium group, and M' represents a hydrogen atom, an alkali metal, an ammonium or alkyl group), —OH, —NR$_2$, —N$^+$R$_3$ (wherein R$_2$ and R$_3$ each represents a hydrocarbon group), an epoxy group, —SN and —CN. It is preferred that all of the above-described resin components (reactive or non-reactive with the curing agent component) have at least one member selected from the group consisting of the above-described polar groups to impart excellent dispersibility as well as excellent durability. These polar groups can be introduced into the resin components by a copolymerization reaction or an addition reaction. The amount of the polar group to be introduced is $1 \times 10^{-1}$ to $1 \times 10^{-8}$ eq/g, preferably $1 \times 10^{-2}$ to $1 \times 10^{-6}$ eq/g.

Specific examples of the binders which can be used in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.); MPR-TA, MPR-TA5, MPR-TAL, MPR-TSN, MPR-TMF, MPR-TS, MPR-TM and MPR-TAO (manufactured by Nisshin Chemical Industry Co., Ltd.); 1000W, DX80, DX81, DX82, DX83 and 100FD (manufactured by Denki Kagaku Kogyo K.K.); MR105, MR110, MR100 and 400X110A (manufactured by Nippon Zeon Co., Ltd.); Nipporan N2301, N2302 and N2304 (manufactured by Nippon Polyurethane Co., Ltd.); Pandex T-5105, T-R3080 and T-5201, Burnock D-400 and D-210-80, Crisvon 6109 and 7209 (manufactured by Dainippon Ink & Chemicals, Inc.); Vylon UR8200, UR8300, UR8600, UR5500, UR4300, RV530 and RV280 (manufactured by Toyobo Co., Ltd.); Daipheramine 4020, 5020, 5100, 5300, 9020, 9022 and 7020 (manufactured by Dainichiseika Color & Chemicals Mfg. Co., Ltd.); MX5004 (manufactured by Mitsubishi Kasei Corporation); Sunprene SP-150 (manufactured by Sanyo Chemical Industries, Ltd.); and Salan F310 and F210 (manufactured by Asahi Chemical Industry Co., Ltd.).

The magnetic recording medium of the present invention comprises a support having thereon a lower non-magnetic layer and a upper magnetic layer. However, the non-magnetic layer and/or the magnetic layer may optionally have a multi-layer structure, so long as the above-described conditions regarding the binder extract and the reacted curing agent are met. Each layer of the multi-layer structure can be a proper composition.

Accordingly, these layers may differ in the amounts of ferromagnetic powder, non-magnetic powder and the binder, the amounts of the vinyl chloride resin and the polyurethane resin in the binder, the amount of the polyisocyanate, the amount of another resin, the molecular weight of each resin in the magnetic layer, the amount of the polar group and the above-described characteristics of the resins.

Examples of the polyisocyanate which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; products of these isocyanates with polyhydric alcohols; and polyisocyanates formed by the condensation of isocyanates. Particularly preferred are trifunctional polyisocyanates.

Examples of the isocyanates which are commercially available include Coronate L (trifunctional), Coronate HL, Coronate 2030, Coronate 2031, Millionate MR and Millionate MTL (manufactured by Nippon Polyurethane Co., Ltd.); Takenate D-102 (trifunctional), Takenate D-110N, Takenate D-200 and Takenate D-202 (manufactured by Takeda Chemical Industries, Ltd.); and Desmodule L (trifunctional), Desmodule IL, Desmodule N and Desmodule HL. These polyisocyanates may be used either alone or in combination by utilizing a difference in curing reactivity in the lower non-magnetic layer and in the upper magnetic layer.

The non-magnetic powder which can be used in the non-magnetic layer of the present invention includes inorganic and organic powders. Carbon black can also be used.

Examples of the non-magnetic inorganic powder which can be used in the non-magnetic layer of the present invention include metals, metal oxides, metal carbonates, metal sulfates, metal nitrides, metal carbides and metal sulfides. Specific examples of the non-magnetic inorganic powder include $TiO_2$ (rutile, anatase), TiOx, cerium oxide, tin oxide, tungsten oxide, ZnO, $ZrO_2$, $SiO_2$, $Cr_2O_3$, α-alumina having an α-conversion of 90% or more, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BASO_4$, silicon carbide and titanium carbide. These compounds may be used either alone or in combination.

These inorganic powders have a particle size of preferably 0.01 to 2 μm. The shape thereof is not critical. Two or more inorganic powders having different particle sizes may be used in combination. When a single non-magnetic powder is used, the particle size distribution thereof may be properly chosen. These non-magnetic powders have a tap density of 0.05 to 2 g/ml, preferably 0.2 to 1.5 g/ml, a water content of 0.1 to 5%, preferably 0.2 to 3%, a pH of 2 to 11, a specific surface area of 1 to 100 $m^2/g$, preferably 5 to 50 $m^2/g$, more preferably 7 to 40 $m^2/g$, a crystallite size of preferably 0.01 to 2 μm, a DBP oil absorption of 5 to 100 ml/100 g, preferably 10 to 80 ml/100 g, more preferably 20 to 60 ml/100 g, and a specific gravity of 1 to 12, preferably 2 to 8. The shape of the nonmagnetic powder may be an acicular spherical, cubic or plate-like shape. It is not required that non-magnetic powder is always 100% pure. The surface of non-magnetic powder may be treated with another compound such as Al, Si, Ti, Zr, Sn, Sb or Zn according to purpose, to form an oxide thereon. When non-magnetic powder has a purity of not lower than 70%, the effect thereof is not reduced. For example, when titanium oxide is used, the surface thereof is generally treated with alumina. It is preferred that ignition loss is 20% or less. It is also preferred that the above inorganic powders have a Mohs' scale of hardness of 4 or more.

Examples of non-magnetic powder which can be used in the non-magnetic layer of the present invention include UA 5600 and UA 5605 (manufactured by Showa Denko K.K.); AKP-20, AKP-30, AKP-50, HIT-55, HIT-100 and ZA-G1 (manufactured by Sumitomo Chemical Co., Ltd.); G5, G7 and S-1 (manufactured by Nippon Chemical Industrial Co., Ltd.); TF-100, TF-120, TF-140 and R516 (manufactured by Toda Kogyo Corp.); TTO-51B, TTO-55A, TTO-55B, TTO-55C, TTO-55S, TTO-55D, FT-1000, FT-2000, FTL-100, FTL-200, M-1, S-1 and SN-100 (manufactured by Ishihara Sangyo Kaisha, Ltd.); ECT-52, STT-4D, STT-30D, STT-30 and STT-65C (manufactured by Titan Kogyo K.K.); T-1 (manufactured by Mitsubishi Materials Corp.); NS-O, NS-3Y and NS-8Y (manufactured by Japan Catalytic Chemical Industry Co., Ltd.); MT-100S, MT-100T, MT-150W, MT-500B, MT-600B and MT-100F (manufactured by Teika KK); FINEX-25, BF-1, BF-10, BF-20, BF-1L and BF-10P (manufactured by Sakai Chemical Industry); DEFIC-Y and DEFIC-R (manufactured by Dowa Mining Co., Ltd.); and Y-LOP (manufactured by Titan Kogyo K.K.).

Examples of carbon black which can be used in the non-magnetic layer of the present invention include furnace black for rubber, thermal black for rubber, carbon black for color and acetylene black. Carbon black has a specific surface area of 100 to 500 $m^2/g$, preferably 150 to 400 $m^2/g$, a DBP oil absorption of 20 to 400 ml/100 g, preferably 30 to 200 ml/100 g, an average particle size of 5 to 80 mμ, preferably 10 to 50 mμ, more preferably 10 to 40 mμ, a pH of 2 to 10, a water content of 0.1 to 10% and a tap density of preferably 0.1 to 1 g/ml.

Specific examples of carbon black which can be used in the non-magnetic layer the present invention include BLACK PEARLS 2000, 1300, 1000, 900, 800, 880 and 700, VULCAN XC-72 (manufactured by Cabot Co., Ltd.); #3050B, #3150B, #3250B, #3750B, #3950B, #950, #650B, #970B, #850B and MA-600 (manufactured by Mitsubishi Kasei Corporation); CONDUCTEX SC, RAVEN 8800, 8000, 7000, 5750, 5250, 3500, 2100, 2000, 1800, 1500, 1255 and 1250 (manufactured by Columbia Carbon Co., Ltd. ; and Ketjen Black EC (manufactured by Akzo Co., Ltd.). The surface of carbon black may be treated with dispersants. Carbon black may be grafted onto a resin. A part of the surface of carbon black may be graphitized. Carbon black may be previously dispersed in the binder before it is added to the non-magnetic coating composition.

These carbon black powders are used in an amount of 50% or less based on the amount of inorganic powder and in an amount of 40% or less based on the total weight of the non-magnetic layer. These carbon black powders may be used either alone or in combination.

Carbon black can be used in the present invention according to *Carbon Black Handbook* edited by Carbon Black Association of Japan.

Examples of non-magnetic organic powder which can be used in the non-magnetic layer the present invention include acrylic styrene resin powder, benzoguanamine resin powder, melamine resin powder, phthalocyanine pigment, polyolefin resin powder, polyester resin powder, polyamide resin powder, polyimide resin powder and polyfluoroethylene resin powder. These resin powders can be prepared by the methods described in JP-A-62-18564 and JP-A-60-255827.

These non-magnetic powders are usually used in a ratio by weight of non-magnetic powder to binder of 20 to 0.1 and in a ratio by volume of non-magnetic powder to binder of 10 to 0.1.

General-purpose magnetic recording mediums are provided with an undercoating layer. The undercoating layer is provided to improve adhesion between the support and the magnetic layer, etc. The undercoating layer has a thickness of 0.5 $\mu$m or less and is different from the lower non-magnetic layer of the present invention. It is preferred that an undercoating layer is provided to improve adhesion between the support and the lower non-magnetic layer in the present invention.

Examples of ferromagnetic powder which can be used in the magnetic layer of the present invention include conventional ferromagnetic powder such as $\gamma$-FeOx (x=1.33 to 1.5), Co-modified $\gamma$-FeOx (x=1.33 to 1.5), $CrO_2$, Fe-, Ni- or Co-based ferromagnetic alloy powder (Fe, Ni or Co content being 75% or more) (e.g., Co—Ni—P alloy, Co—Ni—Fe—B alloy, Fe—Ni—Zn alloy, Ni—Co alloy, Co—Ni—Fe alloy), barium ferrite and strontium ferrite. These ferromagnetic powders may contain, in addition to the above-described elements, other elements such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. These ferromagnetic powders may be treated with dispersant, lubricant, surfactant, antistatic agent, etc., as described hereinafter, before dispersion. The treatment is concretely described in JP-B-44-14090 (the term "JP-B" as used herein means an "examined Japanese patent publication").

Among the above-described ferromagnetic powders, ferromagnetic alloy powders may contain a small amount of hydroxides or oxides. Ferromagnetic alloy powders prepared by conventional methods can be used. Examples of the methods for preparing ferromagnetic powders include the following:

1. a method wherein a composite organic acid salt (mainly an oxalate) is reduced with a reducing gas such as hydrogen;
2. a method wherein iron oxide is reduced with a reducing gas such as hydrogen to obtain Fe or Fe—Co particles;
3. a method wherein a metal carbonyl compound is heat-decomposed, and a method wherein a reducing agent such as sodium boron hydride, a hypophosphite or hydrazine is added to an aqueous solution of a ferromagnetic metal to carry out reduction;
4. a method wherein metal is evaporated in an inert gas under low pressure to obtain fine powder.

The thus-obtained ferromagnetic alloy powders may be subjected to the following conventional slow oxidation treatments:

5. a method wherein the powder is immersed in an organic solvent and then dried;
6. a method wherein after the powder is immersed in an organic solvent, an oxygen-containing gas is introduced into the solution to form an oxide film on the surface of the powder, and the powder is dried;
7. a method wherein partial pressure of an oxygen-containing gas and that of an inert gas are controlled to form an oxide film on the surface of the powder without using any organic solvent.

Ferromagnetic powder contained in the upper magnetic layer of the present invention has a specific surface area of 25 to 80 $m^2/g$, preferably 35 to 70 $m^2/g$, as measured by BET method. When the specific surface area is less than 25 $m^2/g$, noise becomes high, and when the specific surface area is more than 80 $m^2/g$, it is difficult to obtain good surface properties.

Ferromagnetic powder contained in the upper magnetic layer of the present invention has a crystallite size of 100 to 450Å, preferably 100 to 350Å, when determined from the spread of half width by X-ray diffractometry.

Magnetic iron oxide powder has a saturation magnetization ($\rho_s$) of 50 emu/g or more, preferably 70 emu/g or more. Ferromagnetic metallic powder has a saturation magnetization of preferably 100 emu/g or more, more preferably from 110 to 170 emu/g. Ferromagnetic powder has a coercive force of preferably from 1100 to 2500 Oe (oersted), more preferably from 1400 to 2000 Oe. Ferromagnetic powder has an acicular ratio of preferably 18 or less, more preferably 12 or less.

The $\gamma 1500$ of ferromagnetic powder is preferably not higher than 1.5, more preferably not higher than 1.0. The term "$\gamma 1500$" as used herein refers to the percentage of magnetization amount still remaining without inversion when a magnetic field of 1500 Oe in the opposite direction is applied to a magnetic recording medium after the magnetic recording medium is saturation-magnetized.

The water content of ferromagnetic powder is controlled to preferably 0.01 to 2%. It is preferred that the water content of ferromagnetic powder is properly controlled according to the type of the binder. When ferromagnetic powder is $\gamma$-iron oxide, the tap density thereof is preferably 0.5 g/ml or more, more preferably 0.8 g/ml or more. In the case of alloy powder, the tap density is preferably from 0.2 to 0.8 g/ml. When the tap density is more than 0.8 g/ml, the oxidation of ferromagnetic powder is apt to proceed and it is difficult to obtain sufficient magnetization ($\rho_s$), and when the tap density is less than 0.2 g/ml, dispersion is likely to be poor.

When $\gamma$-iron oxide is used, the ratio of iron(II) to iron(III) is preferably 0 to 20%, more preferably 5 to 10%. The ratio of cobalt atoms to iron atoms is 0 to 15%, preferably 2 to 8%.

It is preferred that the pH of ferromagnetic powder is properly chosen according to the type of the binder to be used in combination therewith. The pH is in the range of 4 to 12, preferably 6 to 10. If desired, the surface of ferromagnetic powder may be treated with Al, Si, P or an oxide thereof. The amount of the surface treating agent is 0.1 to 10% based on the amount of ferromagnetic powder. Such a surface treatment is preferred because a lubricant such as a fatty acid adsorbed is 100 mg/$m^2$ or less when the surface treatment is carried out. Ferromagnetic powder often contains soluble inorganic ions such as Na, Ca, Fe, Ni and Sr ions. However, when the content of the inorganic ions is 500 ppm or less, the characteristics of ferromagnetic powder are not affected thereby.

It is preferred that the ferromagnetic powder used in the present invention has a lower void content. The void content is preferably 20% by volume or less, more preferably 5% by volume or less. When characteristics with regard to particle size can be met, the shape of the ferromagnetic powder may be an acicular, granular, ellipsoidal or plate-like shape. In the case of needle ferromagnetic powder, the acicular ratio thereof is preferably 12 or less. It is necessary that Hc distribution of ferromagnetic powder is made narrow to achieve SFD (switching field distribution) of 0.6 or less. To achieve this value, one may use a method wherein the particle size distribution of goethite is properly made, a method wherein γ-hematite is prevented from being sintered, and a method wherein the deposition rate of cobalt is retarded in comparison with conventional deposition rates in the preparation of Co-modified iron oxide.

Further, in the present invention, there can be used platy hexagonal ferrites, for example, substituted ferrites such as barium ferrite, strontium ferrite, lead ferrite and calcium ferrite; ,Co-substituted ferrites; and hexagonal Co powder. Specific examples thereof include magnetoplumbite type barium ferrite and strontium ferrite, and partially spinel structural magnetoplumbite type barium ferrite and strontium ferrite. Particularly preferred are barium ferrite and strontium ferrite.

Elements such as Co—Ti, Co—Ti—Zr, Co—Ti—Zn, Ni—Ti—Zn or Ir—Zn may be added to the hexagonal ferrite to control the coercive force thereof.

Usually, hexagonal ferrite comprises hexagonal platy particles. The particle size thereof is the width of the plate of the particle and is measured by using an electron microscope. In the present invention, the particle size is controlled to preferably from 0.01 to 0.2 μm, particularly preferably from 0.03 to 0.1 μm. The average thickness (thickness of plate) of the fine particles is from 0.001 to 0.2 μm, particularly preferably from 0.003 to 0.05 μm. Further, the plate ratio (]particle size/thickness of plate) is from 1 to 10, preferably from 3 to 7. The specific surface area ($S_{BET}$) Of these hexagonal ferrite fine powders is preferably from 25 to 70 m²/g. The specific surface area is a value obtained by making measurement with BET one point method (partial pressure: 0.30) using Quantarsorb (manufactured by US Quantarchrom, Co., Ltd.) after dehydration at 30° C. in a nitrogen gas atmosphere for 30 minutes.

Examples of carbon black which can be used in the upper magnetic layer of the present invention include furnace black for rubber, thermal black for rubber, carbon black for color and acetylene black. Carbon black has preferably a specific surface area of 5 to 500 m²/g, a DBP oil absorption of 10 to 400 ml/100 g, an average particle size of 5 to 300 mμ, a pH of 2 to 10, a water content of 0.1 to 10% and a tap density of 0.1 to 1 g/ml. Specific examples of carbon black which can be used in the present invention include BLACK PEARLS 2000, 1300, 1000, 900, 800 and 700, VULCAN XC-72 (manufactured by Cabot Co., Ltd.); #80, #60, #55, #50 and #35 (manufactured by Asahi Carbon Co., Ltd.); #2400B, #2300, #900, #1000, #30, #40 and #10B (manufactured by Mitsubishi Kasei Corporation); and CONDUCTEX SC, RAVEN 150, 50, 40 and 15 (manufactured by Columbia. Carbon Co., Ltd.). The surface of carbon black may be treated with dispersants.

Carbon black may be grafted onto a resin. A part of the surface of carbon black may be graphitized. Carbon black may be previously dispersed in the binder before carbon black is added to the magnetic coating composition. These carbon black may be used either alone or in combination. Carbon black is used in an amount of preferably 0.1 to 30% based on the amount of ferromagnetic powder. Carbon black is capable of imparting antistatic properties to the magnetic layer, reducing a coefficient of friction of the magnetic layer, imparting light-screening properties to the magnetic layer and improving the strength of the magnetic layer. These functions vary depending on carbon black to be used. Accordingly, the carbon black is used in the lower and upper layers by taking into consideration the types, amounts and combinations of carbon black, the above-described characteristics such as particle size, oil absorption, electric=conductivity, pH, etc. For example, carbon black which can be used in the upper layer can be properly chosen by referring to *Carbon Black Handbook* edited by Carbon Black Association of Japan.

If desired, the magnetic layer of the present invention may contain non-magnetic organic powder which can be used in the non-magnetic layer.

Examples of the abrasive which can be used in the upper magnetic layer of the present invention include conventional materials having a Mohs' scale of hardness of 6 or more such as α-alumina having an a conversion of 90% or more, β-alumina, silicon carbide, chromium oxide, cerium oxide, α-iron oxide, corundum, artificial diamond, silicon nitride, silicon carbide, titanium carbide, titanium oxide, silicon dioxide and boron nitride. These compounds may be used either alone or in combination. Composite materials (obtained by treating the surface of an abrasive with other abrasive) may be used. These abrasives often contain other compounds or element than the principal component. However, when the content of the principal component is 90% or more, the effect thereof is not reduced. The abrasives have a particle size of preferably 0.01 to 2 μm. If desired, abrasives having different particle sizes may be used in combination, or when an abrasive alone is used, the particle size distribution thereof may be widened to provide a similar effect to that of the composite material. The abrasives have preferably a tap density of 0.3 to 2 g/ml, a water content of 0.1 to 5%, a pH of 2 to 11 and a specific surface area of 1 to 30 m²/g. The abrasives used in the present invention may be in any form of a needle, a sphere and a die. However, abrasives having a partly edgy form are preferred because they have a high abrasive effect.

Specific examples of the abrasives which can be used in the present invention include AKP-20A, AKP-30, AKP-50, HIT-50 and HIT-100 (manufactured by Sumitomo Chemical Co., Ltd.); G5, G7 and S-1 (manufactured by Nippon Chemical Industrial Co., Ltd.); and TF-100 and TF-140 (manufactured by Toda Kogyo Corp.). The abrasives can be properly used in the lower and upper layers by varying the types, amounts and combinations thereof according to purpose. These abrasives may be previously dispersed in the binder and then added to the magnetic coating composition. The amount of the abrasive present on the surface and edge surface of the upper magnetic layer of the magnetic recording medium of the present invention is preferable 5 particles per 100 μm² or more.

Further, compounds having a lubricating effect, an antistatic effect, a dispersion effect, a plasticizing effect, etc., can be used as additives in the present invention. Examples of the additives include molybdenum disulfide, tungsten disulfide, graphite, boron nitride, fluorinated graphite, silicone oil, silicone having a polar group, fatty acid-modified silicone, fluorinated silicone, fluorinated alcohols, fluorinated esters, polyolefins, polyglycols, alkylphosphoric esters and alkali metal salts thereof, alkylsulfuric esters and alkali metal salts thereof, polyphenyl ethers, fluorinated alkylsulfuric esters and alkali metal salts thereof, monobasic fatty acids (which may have unsaturated bonds or branched chains) having from 10 to 24 carbon atoms and metal salts (e.g., Li, Na, K, Cu, etc.) thereof; monohydric to hexahydric alcohols having 12 to 22 carbon atoms (which may have unsaturated bonds or branched-chains); alkoxyalcohols having from 12 to 22 carbon atoms; mono-, di- or tri-fatty acid esters derived from monobasic fatty acids having 10 to 24 carbon atoms (which may have unsaturated bonds or branched chains) and any monohydric to hexahydric alcohols having from 2 to 12 carbon atoms (which may have unsaturated bonds or branched chains); fatty acid esters derived from monoalkyl ethers of alkylene oxide polymers; fatty acid amides having 8 to 22 carbon atoms; and aliphatic amines having 8 to 22 carbon atoms.

Specific examples of the fatty acids and derivatives thereof and the alcohols which can be used as the additives in the present invention include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol.

Examples of surfactants which can be used in the present invention include nonionic surfactants such as alkylene oxides, glycerins, glycidols and ethylene oxide adducts of alkyl phenols; cationic surfactants such as cyclic amines, ester amides, quaternary ammonium salts, hydantoin derivatives, heterocyclic compounds, phosphonium salts and sulfonium salts; anionic surfactants having an acid group such as a carboxyl, sulfo, phosphoric, sulfuric ester or phosphoric ester group; and ampholytic surfactants such as amino acids, aminosulfonic acids, aminoalcohol sulfates or phosphates and alkylbetaines. The details of these surfactants are described in *Surfactant Handbook* (published by Sangyo Tosho KK). It is not required that these lubricants and surfactants are always 100% pure. They may contain, in addition to the principal component, impurities such as isomers, unreacted compound, by-products, decomposition products, oxides, etc. The amount of these impurities is preferably 30% or less, more preferably 10% or less.

These lubricants and surfactants can be properly used in the lower non-magnetic layer and the upper magnetic layer by varying the types and amounts thereof. For example, the lower non-magnetic layer contains a fatty acid having a melting point which is different from that of a fatty acid used in the upper magnetic layer to thereby control the oozing thereof onto the surface. Esters having different boiling points or polarities are used to control the oozing thereof onto the surface. The amount of the surfactant is controlled to improve the stability of coating. The lower nonmagnetic layer contains the lubricant in an amount which is larger than that of the lubricant contained in the upper magnetic layer to thereby improve the lubricating effect.

Embodiments are not limited to the above examples, but various other embodiments can be made.

The whole or a part of the additives which can be used in the present invention may be added at any stage during the course of the preparation of the magnetic coating composition and the non-magnetic coating composition. For example, the additives may be mixed with the ferromagnetic powder before the kneading stage. The additives may be added to the kneading stage where the ferromagnetic powder, the binder and the solvent are kneaded. The additives may be added during or after the dispersion stage. The additive may be added just before coating.

Examples of commercially available lubricants which can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, caster oil-hardened fatty acids, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion TO-221, Monoguri MB, Nonion DS-60, Anon BF, Anon LG, butyl stearate, butyl laurate and erucic acid (manufactured by Nippon Oils & Fats Co., Ltd.); oleic acid (manufactured by Kanto Chemical Co., Ltd.); FAL-205 and FAL-123 (manufactured by Takemoro Yushi Co., Ltd.); Enujerubu LO, Enujerubu IPM and Sansosyzer E-4030 (manufactured by Shin Nippon Rika Co., Ltd.); TA-3, KF-96, KF-96L, KF-96H, KF410, KF420, KF965, KF54, KF50, KF56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910 and KF-3935 (manufactured by Shin-Etsu Chemical Co., Ltd.); Armide P, Armide C and Armoslip CP (manufactured by Lion Ahmer Co., Ltd.); Duomin TDO (manufactured by Lion Fat and Oil Co., Ltd.); BA-41G (manufactured by Nissin Oil Mills, Co., Ltd.); and Profan 2012E, Newpole PE61, Ionet MS-400, Ionet MO-200, Ionet DL-200, Ionet DS-300, Ionet DS-1000 and Ionet DO-200 (manufactured by Sanyo Chemical Industries, Ltd.).

Organic solvents may be used in an arbitrary ratio. Examples of the organic solvents which can be used in the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin, dichlorobenzene; N,N-dimethylformamide; and hexane. It is not required that these organic solvents are 100% pure. The organic solvents may contain, in addition to the principal component, impurities such as isomers, unreacted materials, by-products, decomposition products, oxides, water, etc. The content of the impurities is preferably 30% by weight or less, more preferably 10% by weight or less. If desired, organic solvents used in the upper magnetic layer may be different in type and amount from those used in the lower non-magnetic layer. For example, organic solvents which are higher volatile are used in the upper magnetic layer to improve surface properties. Organic solvents having a high surface tension (e.g., cyclohexanone, dioxane) are used in the lower non-magnetic layer to improve the stability of coating. Organic solvents having a high solubility parameter are used in the magnetic layer to improve the degree of loading. Embodiments are not limited to these specific examples, and other various embodiments can be made.

The magnetic recording medium of the present invention has such a thickness profile in which the non-magnetic support has a thickness of 1 to 100 $\mu$m, preferably 6 to 20 $\mu$m, the lower non-magnetic layer has a thickness of 0.5 to 10 $\mu$m, preferably 1 to 5 $\mu$m, and the upper magnetic layer has a thickness of preferably 1.5 $\mu$m or less, more preferably 1.0 $\mu$m or less, particularly preferably 0.5 $\mu$m or less. The combined thickness of the lower non-magnetic layer and the upper layer is in the range of 1 to 100 times to twice the thickness of the non-magnetic support. An undercoating layer may be provided between the non-magnetic support and the lower non-magnetic layer to improve adhesion therebetween. The undercoating layer has a thickness of 0.01 to 2 $\mu$m, preferably 0.05 to 0.5 $\mu$m. Further, a back coat layer may be provided on the opposite side of the support to the magnetic layer. The back coat layer has a thickness of 0.1 to 2 $\mu$m, preferably 0.3 to 1.0 $\mu$m. The undercoating layer and the back coat layer may be conventional layers.

Examples of the non-magnetic support which can be used in the present invention include conventional films such as films of polyesters (e.g., polyethylene terephthalate, polyethylene naphthalate), polyolefins, cellulose triacetate, polycarbonates, polyamides, polyimides, polyamide-imides, polysulfones, aramid and aromatic polyamides. These support may be subjected to a corona discharge treatment, a plasma treatment, an undercoating treatment, a heat treatment or a dust removal treatment. It is necessary that the nonmagnetic support having a center line average surface roughness of 0.03 $\mu$m or less, preferably 0.02 $\mu$m or less, more preferably 0.01 $\mu$m or less, is used to achieve the object of the present invention. Further, it is preferred that not only the center line average surface roughness of the non-magnetic support is small, but also that the support does not have any coarse protrusion of 1 $\mu$m or more. The roughness of the surface thereof can be arbitrarily controlled by the size and amount of a filler which is optionally added to the support. Examples of the filler include powders of oxides and carbonates of Ca, Si and Ti and acrylic organic fine powder.

The F-5 (i.e., the load at the 5% elongation) value of the non-magnetic support of the present invention is preferably from 5 to 50 kg/mm$^2$ in the tape running direction and from 3 to 30 kg/mm$^2$ in the tape width direction. Generally, the F-5 value in the tape running direction is higher than that in the tape width direction. However, the F-5 value in the tape width direction may be higher than that in the running direction when the strength of the tape in the width direction is to be increased.

The heat shrinkage ratio of the non-magnetic support in the tape running direction and in the tape width direction at 100° C for 30 minutes is preferably 3% or less, more preferably 1.5% or less, and that at 80° C. for 30 minutes is preferably 1% or less, more preferably 0.5% or less. The breaking strength of the non-magnetic support in the tape running direction and in the tape width direction is preferably 5 to 10 kg/mm$^2$, and the modulus thereof is preferably 100 to 2,000 kg/mm$^2$.

The manufacturing stage of the magnetic coating composition and the non-magnetic coating composition for the preparation of the magnetic recording medium of the present invention comprises at least the kneading stage and the dispersion stage. In addition thereto, the mixing stage is optionally provided before or after the kneading stage and the dispersion stage. Each stage may be divided into two or more steps. All of the materials such as the ferromagnetic powder, the non-magnetic powder, the binder, the carbon black, the abrasive, the antistatic agent, the lubricant and the solvent may be added to the first stage or may be separately added during the preparation of the coating compositions. Each material may be added portionwise at two or more stages. For example, polyurethane may be added in portions to the kneading stage, the dispersion stages and the mixing stage for the controlling of viscosity after dispersion.

Conventional manufacturing processes may be used as a part of the stages of the present invention, to achieve the object of the present invention. A kneader having an intense kneading force such as a continuous kneader or a pressure kneader can be used in the kneading stage, whereby a magnetic recording medium which gives high Br (residual magnetic flux density) can be obtained. When the continuous kneader or the pressure kneader is used, the whole or a part (preferably at least 30% by weight of the binder) of the binder is kneaded in an amount of 15 to 500 parts by weight per 100 parts by weight of ferromagnetic powder. The details of the kneading treatment are described in JP-A-1-106338 and JP-A-1-79274.

Examples of apparatuses and methods for carrying out coating by means of a wet-on-wet coating system to prepare a magnetic recording medium having a multi-layer structure as in the present invention include the following apparatuses and methods:

1. the lower layer is first coated by means of gravure coating, roll coating, blade coating or extrusion coating apparatus. While the lower layer is still in a wet state, the upper layer is then coated on the lower layer by using a support pressing type extrusion coater as described in JP-B-1-46186, JP-A-60-238179 and JP-A-2-265672.
2. the lower layer and the upper layer are substantially simultaneously coated by using a coating head provided with two slits through which the coating compositions are passed as described in JP-A-63-88080, JP-A-2-17971 and JP-A-2-265672.
3. the lower layer and the upper layer are substantially simultaneously coated by using an extrusion coater provided with back-up roller as described in JP-A-2-174965.

It is desirable that shear is applied to the coating composition within the coating head by a method described in JP-A-62-95174 or JP-A-1-236968 to prevent the electromagnetic characteristics, etc. of the resulting magnetic recording medium from being lowered by the agglomeration of ferromagnetic powder. Further, it is necessary that the viscosity of the coating composition is in the range of numerical values described in JP-A-3-8471.

Intense orientation is made to obtain the magnetic recording medium of the present invention. It is preferred that a solenoid of 1,000 G (gauss) or more and a cobalt magnet of 2,000 G or more are used in combination. Further, it is preferred that a suitable drying stage is provided before orientation so that orientation after drying reaches the highest level. When the present invention is applied to disk type mediums, it is preferred that an orientation method is used to randomize orientation.

Rolls of heat-resistant plastics such as epoxy resin, polyimide, polyamide and polyimide-amide are used as calendering rolls. Metallic rolls may be used. Treating temperature is preferably 70° C. or more, more preferably 80° C. or more. Linear pressure is preferably 200 kg/cm or more, more preferably 300 kg/cm or more.

The upper layer of the magnetic recording medium of the present invention and the opposite surface thereto have a coefficient of friction of preferably 0.5 or less, more preferably 0.3 or less, against SUS 420J. The magnetic layer has a surface resistivity of preferably $10^4$ to $10^{11}$ Ω/sq. When the lower layer alone is coated, the surface resistivity is preferably $10^4$ to $10^8$ Ω/sq. The back layer has a surface resistivity of preferably $10^3$ to $10^9$ Ω/sq.

The upper layer has a modulus at 0.5% elongation of preferably 100 to 2,000 kg/mm$^2$ in the running direction and in the width direction and a breaking strength of 1 to 30 kg/cm$^2$. The magnetic recording medium has a modulus of preferably 100 to 1,500 kg/mm$^2$ in the running direction and in the width direction, a residual elongation of preferably 0.5% or less and a heat shrinkage ratio of preferably 1% or less, more preferably 0.5% or less, still more preferably 0.1% or less, over a temperature range of 100° C. or less.

The amount of the solvent left behind in the upper layer is preferably 100 mg/m$^2$ or less, more preferably 10 mg/m$^2$ or less. It is preferred that the amount of the solvent left in the upper layer is less than that of the solvent left in the lower layer.

Each of the upper layer and the lower layer has a void content of preferably 30% by volume or less, more preferably 20% by weight or less. A lower void content is preferred to obtain a high output. However, it is sometimes preferred that the content of the non-magnetic layer is increased according to purpose. For example, good running durability can be often achieved when the non-magnetic layer has a higher void content in the magnetic recording medium for data recording in which repeated use is important.

The magnetic recording medium of the present invention has such magnetic characteristics that the squareness ratio thereof in the tape traveling direction is 0.70 or more, preferably 0.80 or more, more preferably 0.90 or more, when measured at a magnetic field of 5 kOe. The squareness ratio in two directions perpendicular to the tape running direction is preferably 80% or less of that in the tape running direction. The SFD of the magnetic layer is preferably 0.6 or less.

The center line average surface roughness Ra of the magnetic layer is from 2 to 20 nm, preferably 5.0 nm or less. However, the value of Ra should be properly set according to purpose. It is preferred that Ra is small when electromagnetic characteristics is to be improved. On the other hand, a large Ra value is preferred when running durability is to be improved. It is preferred that RMS surface roughness $R_{RMS}$ as determined by evaluation of STM is in the range of 3 to 16 nm.

The magnetic recording medium of the present invention has a lower layer and a upper layer. The lower and upper layers may be different in physical characteristics from each other according to purpose. For example, the modulus of the magnetic layer is increased to improve running durability, and at the same time, the modulus of the non-magnetic layer is set to a value which is lower than the modulus of the magnetic layer to improve the head touch of the magnetic recording medium.

The present invention is further illustrated in greater detail by reference to the following examples and comparative examples. In the following examples and comparative examples, all parts are by weight.

EXAMPLE 1

| | |
|---|---|
| Non-magnetic coating composition | |
| Non-magnetic inorganic powder | 80 parts |
| TiO$_2$ | |
| crystal structure: rutile type | |
| average primary particle size: 0.035 μm | |
| TiO$_2$ content: 90% or more | |
| specific surface area: 40 m$^2$/g | |
| DBP oil absorption: 27–38 ml/100 g | |
| pH: 7 | |
| Carbon black | 20 parts |
| average primary particle size: 16 mμ | |
| Specific surface area (BET): 250 m$^2$/g | |
| DBP oil absorption: 80 ml/100 g | |
| pH: 8.0 | |
| volatile matter content: 1.5% | |
| Vinyl chloride-vinyl acetate-vinyl | 8 parts |
| alcohol copolymer | |
| composition ratio (molar ratio) = 86:13:1 | |
| a degree of polymerization: 400 | |
| —N(CH$_3$)$_2$$^+$Cl$^-$ group content: 5 × 10$^{-4}$ eq/g | |
| Polyurethane | 6 parts |
| neopentyl glycol/caprolactone polyol/MDI = 0.9/2.6/1 | |
| —SO$_3$Na group content: 1 × 10$^{-4}$ eq/g | |
| weight-average molecular weight: 15,000 | |
| Butyl stearate | 1 part |
| Myristic acid | 1 part |
| Methyl ethyl ketone | 100 parts |
| Cyclohexanone | 50 parts |
| Toluene | 50 parts |
| Magnetic coating composition | |
| Ferromagnetic metallic fine powder | 100 parts |
| composition: Fe/Zn/Ni = 92/6/2 | |
| Hc: 1600 Oe | |
| specific surface area (BET): 60 m$^2$/g | |
| crystallite size: 195Å | |
| particle size (long axis): 0.20 μm | |
| acicular ratio: 10 | |
| saturation magnetization ($\sigma_s$): 130 emu/g | |
| Vinyl chloride copolymer | 8 parts |
| —SO$_3$Na group content: 1 × 10$^{-4}$ eq/g | |
| a degree of polymerization: 300 | |
| Polyurethane | 6 parts |
| neopentyl glycol/caprolactone polyol/phthalic acid/MDI system | |
| polar group: —SO$_3$Na | |
| weight-average molecular weight: 26,000 | |
| α-Alumina | 2 parts |
| average particle size: 0.3 μm | |
| Carbon black | 0.5 parts |
| average particle size: 0.10 μm | |
| Butyl stearate | 1 part |
| Myristic acid | 1 part |
| Stearic acid | 1 part |
| Methyl ethyl ketone | 90 parts |
| Cyclohexanone | 50 parts |
| Toluene | 60 parts |

The above ingredients for each of the above coating compositions were kneaded in a continuous kneader and dispersed in a sand mill. To the resulting dispersion for the non-magnetic coating composition, there was added 6 parts of a trifunctional low-molecular polyisocyanate compound. To the resulting dispersion for the magnetic coating composition, than was added 6 parts of the trifunctional low-molecular polyisocyanate compound. Thus, there was prepared a non-magnetic coating composition and a magnetic coating composition.

The non-magnetic coating composition and the magnetic coating composition were coated on a polyethylene terephthalate support of 10 μm in thickness by means of simultaneous multi-layer coating in the following manner.

The non-magnetic coating composition was coated on the support in such an amount so as to give a dry thickness of 2.5 μm to form a lower non-magnetic layer. Immediately thereafter, the magnetic coating composition was coated on the lower non-magnetic layer in such an amount as to give a dry thickness of 0.5 μm to form an upper magnetic layer. While both layers were still in a wet state, the coated product was passed through a magnetic field to carry out orientation. After drying, the resulting product was subjected to a surface smoothing treatment at 90° C. by using a 7-stage calender constructed from only metallic rolls, and then slitted into a ½-inch magnetic tape.

Further, other samples given in Table 1 were prepared in the same manner as described above. In Table 1, P in P/H ratio represents the proportion of polyurethane, that is, [100×parts of polyurethane/(parts of polyurethane+parts of vinyl chloride resin+parts of polyisocyanate)], and H represents the proportion of polyisocyanate, that is, [100×parts of polyisocyanate/(-parts of polyurethane+parts of vinyl chloride resin+parts of polyisocyanate)].

TABLE 1

| Sample No. | Magnetic coating composition | | | Non-Magnetic coating composition | | | Coating system | Thickness (μm) of coated layer | |
| --- | --- | --- | --- | --- | --- | --- | --- | --- | --- |
| | Mw of polyurethane | Polar group of polyurethane | P/H ratio | Mw of polyurethane | Polar group of polyurethane | P/H ratio | | Magnetic layer (upper layer) | Non-magnetic layer (lower layer) |
| Example 1 | $2.6 \times 10^4$ | attached | 30/30 | $1.5 \times 10^4$ | attached | 30/30 | simultaneously multi-layer coating | 0.5 | 2.5 |
| Example 2 | $3.8 \times 10^4$ | attached | 40/20 | $1.3 \times 10^4$ | attached | 40/20 | simultaneously multi-layer coating | 0.5 | 2.5 |
| Comparative Example 1 | $5.0 \times 10^4$ | attached | 50/10 | $1.0 \times 10^4$ | attached | 50/10 | simultaneously multi-layer coating | 0.5 | 2.5 |
| Comparative Example 2 | $2.6 \times 10^4$ | attached | 30/30 | $1.5 \times 10^4$ | attached | 30/30 | successive multi-layer coating | 0.5 | 2.5 |
| Comparative Example 3 | $2.6 \times 10^4$ | omitted | 30/30 | $1.5 \times 10^4$ | omitted | 30/30 | simultaneously multi-layer coating | 0.5 | 2.5 |
| Comparative Example 4 | $2.6 \times 10^4$ | omitted | 50/10 | $1.5 \times 10^4$ | omitted | 50/10 | simultaneously multi-layer coating | 0.5 | 2.5 |
| Comparative Example 5 | $2.6 \times 10^4$ | omitted | 30/30 | — | — | — | single layer | 3.0 | — |
| Comparative Example 6 | $2.6 \times 10^4$ | attached | 30/30 | — | — | — | single layer | 3.0 | — |
| Comparative Example 7 | $1.0 \times 10^4$ | attached | 30/30 | $1.5 \times 10^4$ | attached | 30/30 | simultaneously multi-layer coating | 0.5 | 2.5 |
| Comparative Example 8 | $2.6 \times 10^4$ | attached | 60/0 | $1.5 \times 10^4$ | attached | 60/0 | simultaneously multi-layer coating | 0.5 | 2.5 |

EXAMPLE 2

The procedure of Example 1 was repeated except that the compositions of the magnetic coating composition and the non-magnetic coating composition were changed as shown in Table 1.

COMPARATIVE EXAMPLE 1

The procedure of Example 1 was repeated except that the compositions of the magnetic coating composition and the non-magnetic coating composition were changed as shown in Table 1.

COMPARATIVE EXAMPLE 2

The procedure of Example 1 was repeated except that the compositions of the magnetic coating composition and the non-magnetic coating composition were changed as shown in Table 1, and coating was carried out by a successive multi-layer coating system wherein the magnetic layer was coated after the non-magnetic layer was coated.

COMPARATIVE EXAMPLES 3 AND 4

The procedure of Example 1 was repeated except that the compositions of the magnetic coating composition and the non-magnetic coating composition were changed as shown in Table 1, and polyurethane having no polar group was used.

COMPARATIVE EXAMPLE 5

The procedure of Example 1 was repeated except that only the magnetic layer was coated, the non-magnetic layer was not provided and the resin component having no polar group was used.

COMPARATIVE EXAMPLE 6

The procedure of Example 1 was repeated except that only the magnetic layer was coated and the non-magnetic layer was not coated.

COMPARATIVE EXAMPLE 7

The procedure of Example 2 was repeated except that the composition of the magnetic coating composition and the weight-average molecular weight of polyurethane were changed as shown in Table 1.

COMPARATIVE EXAMPLE 8

The procedure of Example 1 was repeated except that the! curing agent component was eliminated from the magnetic coating composition and the non-magnetic coating composition.

The magnetic tapes obtained by Examples and Comparative Examples were tested to examine surface roughness Ra, reproducing RF output and the staining of guide pole. The ratio of the curing agent component present in the area between the surface of the magnetic layer and a position of about 0.1 μm in depth from the surface of the magnetic layer to the total amount of the curing agent component present in the magnetic layer (the ratio of curing agent component in Table 2). The weight-average molecular weight of polyurethane as the resin component extracted with TMF (Mw of THF extract in Table 2) was determined, the THF extract being obtained by extracting polyurethane as the resin component, present in an area between the outer surface of the magnetic layer and a position of 0.1 μm in depth from the outer surface of the magnetic layer, with THF. The evaluation methods were as follows.

1. Surface roughness Ra

The surface roughness was measured by using a contact surface roughness tester (Surfcom 800A type manufactured by Tokyo Seimitsu Co., Ltd.). The cut off value was 0.08 mm.

2. Reproducing RF output

Video signals of image signals 501RE (The Institute of Radio Engineers) were recorded with reference image transcription current. The mean value of the envelope of the reproducing RF output thereof was measured. The reproducing RF output was calculated from the following formula:

Reproducing RF output $(dB) = 20\log_{10} V/V_0$

V: mean value
$V_0$: reference value

3. Staining of guide pole

The resulting tape was run 50 times. The guide pole was taken out from the actually run in-cassette and inspected through a stereomicroscope. The level of staining was evaluated.

4. Ratio of curing agent component

The magnetic recording medium was extracted with n-hexane at room temperature for 30 minutes. The N/Fe of the surface of the magnetic layer of the magnetic recording medium was determined by ESCA. The magnetic recording medium used in the extraction with n-hexane was drawn, and the whole coated layer was peeled off, thoroughly crushed in an agata mortar and pelletized into 10 mmφ pellets. The N/Fe of the whole coated layer was determined from the pellets by ESCA. The ratio was determined by dividing the former (i.e., the N/Fe of the surface of the magnetic layer) by the latter (i.e., the N/Fe of the whole coated layer).

5. Mw of THF extract

A layer of about 0.1 μm between the outer surface of the magnetic layer and a position of about 0.1 μm in depth from the surface of the magnetic layer was scraped off with an abrasive tape (#700). The resulting magnetic layer powder was extracted with tetrahydrofuran. The weight-average molecular weight of the soluble matter was determined by means of GPC. To determine the molecular weight of polyurethane, a measurement with an UV detector was made by utilizing the fact that since polyurethane contained MDI, polyurethane had absorption in the ultraviolet region and the vinyl chloride copolymer had no absorption in the ultraviolet region. The measuring device used was HLC-8020 manufactured by Tosoh Co., Ltd. A calibration curve was prepared using polystyrene.

The results are shown in Table 2.

The evaluation is made as follows.

Staining of guide pole
The mark O: not stained
The mark X: stained

Overall evaluation
The mark O: good
The mark Δ: poor
The mark X: bad

TABLE 2

| Sample No. | Analysis of finished magnetic tape | | Ra (nm) | Reproducing RF output (dB) | Staining of guide pole | Overall evaluation |
|---|---|---|---|---|---|---|
| | Mw of THF extract | Ratio of curing agent component | | | | |
| Example 1 | $3.6 \times 10^4$ | 1.7 | 2.5 | +2.0 | O | O |
| Example 2 | $3.5 \times 10^4$ | 1.4 | 4.5 | +1.5 | O | O |
| Comparative Example 1 | $3.5 \times 10^4$ | 1.1 | 6.2 | +0.5 | O | Δ |
| Comparative Example 2 | $1.8 \times 10^4$ | 1.1 | 9.7 | −0 | X | X |
| Comparative Example 3 | $4.0 \times 10^4$ | 1.7 | 7.2 | −0.5 | O | X |
| Comparative Example 4 | $2.0 \times 10^4$ | 1.1 | 7.5 | −1.0 | O | X |
| Comparative Example 5 | $3.8 \times 10^4$ | 1.9 | 6.3 | −0.8 | O | X |
| Comparative Example 6 | $3.5 \times 10^4$ | 1.8 | 2.2 | O | O | X |
| Comparative Example 7 | $1.3 \times 10^4$ | 1.8 | 2.0 | +2.3 | X | X |
| Comparative | $1.2 \times 10^4$ | — | 4.3 | +0.8 | X | X |

TABLE 2-continued

| Sample No. | Analysis of finished magnetic tape | | Ra (nm) | Reproducing RF output (dB) | Staining of guide pole | Overall evaluation |
|---|---|---|---|---|---|---|
| | Mw of THF extract | Ratio of curing agent component | | | | |
| Example 8 | | | | | | |

It is apparent from Tables 1 and 2 that the samples of the present invention have good surface roughness and improved RF output, do not cause the staining of guide pole, and have improved running durability. These effects are thought to be due to the fact that the amount of the curing agent component reacted in the surface layer of the magnetic layer is increased, and as a result, the rate of reaction of polyurethane is increased and the strength of the surface of the magnetic layer is increased.

In the present invention, the average molecular weight of the binder formed by the reaction of the curing agent component with the binder present in an area in the vicinity of the outer surface of the magnetic layer, that is, in an area between the surface of the magnetic layer and a position of 0.1 μm in depth from the surface of the magnetic layer is controlled so that the average molecular weight of the binder formed is higher than that of the binder formed in the whole of the magnetic layer, whereby the amounts of unreacted or unadsorbed binder which causes the staining of head and guide pole is reduced and running durability is improved. The flexibility of the whole of the magnetic layer and the whole of the coated layers is kept and head touch is improved by ensuring the ratio of the curing agent component reacted in the range defined above.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
a non-magnetic support having thereon (i) a lower non-magnetic layer comprising a non-magnetic powder and a binder, the binder comprising a resin component comprising polyurethane having a polar group and a vinyl chloride copolymer having a polar group, and curing agent comprising a trifunctional isocyanate, the polyurethane having a weight average molecular weight of 10,000 to 50 000, and (ii) an Upper magnetic layer comprising a ferromagnetic powder and a binder, the magnetic layer binder comprising a resin component comprising polyurethane having a polar group and a vinyl chloride copolymer having a polar group, and a curing agent comprising a trifunctional isocyanate, the polyurethane having a weight average molecular weight of 10,000 to 50,000, the surface of the upper magnetic layer having a center line average surfaco roughness of 5.0 μm or less, and the lower non-magnetic layer and the upper magnetic layer being prepared by simultaneous multi-layer coating and orientation while the lower non-magnetic layer and the upper magnetic layer are in a wet state;
wherein an extract, obtained by extracting with tetrahydrofuran the binder present in the area between the outer surface of the upper magnetic layer and a position 0.1 μm in depth from the outer surface, has a weight-average molecular weight of 15,000 to 60,000; and
wherein the reaction ratio of the curing agent reacted with the binder in the area between the outer surface of the upper magnetic layer and a position 0.1 μm in depth from the outer surface is at least 1.3 times as much as the reaction ratio of the total curing agent reacted with the total binder in the lower non-magnetic and upper magnetic layers as a whole.

2. The magnetic recording medium as in claim 1, wherein the reaction ratio of the curing agent reacted with the binder in the area between the outer surface of the upper magnetic layer and a position 0.1 μm in depth from the outer surface is 1.3 to 2.2 times as much as the reaction ratio of the total curing agent reacted with the total binder in the lower non-magnetic and upper magnetic layers as a whole.

3. The magnetic recording medium as in claim 1, wherein the center line average roughness is from 2 to 4 nm.

4. A process for preparing a magnetic recording medium, comprising the steps of:
coating a non-magnetic coating composition comprising a non-magnetic powder and a binder on a non-magnetic support to form a lower non-magnetic layer, the binder comprising a resin component comprising polyurethane having a polar group and a vinyl chloride copolymer having a polar group, and a curing agent comprising trifunctional isocyanate, the polyurethane having a weight average molecular weight of 10,000 to 50,000;
simultaneously or successively coating a magnetic coating composition comprising ferromagnetic a polyurethane and polyisocyanate having a polar group and a powder and a binder on the lower non-magnetic layer while the lower non-magnetic layer is still in a wet state to form an upper magnetic layer, the magnetic coating composition binder comprising a resin component comprising polyurethane having a polar group and a vinyl chloride copolymer having a polar group, and a curing agent comprising trifunctional isocyanate, the polyurethane having a weight average molecular weight of 10,000 to 50,000; and
drying the support having the non-magnetic coating composition and magnetic coating composition thereon to obtain a magnetic recording medium comprising the non-magnetic support having thereon at least two layers including the lower non-magnetic layer and the upper magnetic layer, the surface of the upper magnetic having a center line average surface roughness of 5.0 μm or less, wherein the reaction ratio of the curing agent reacted with the binder present in the area between the outer surface of the dried magnetic layer and a position 0.1 μm in depth from the outer surface of the magnetic layer is at least 1.3 times as much as the reaction ratio of the total curing agent reacted with the total binder in the coated layers as a whole.

5. The magnetic recording medium as in claim 4, wherein the reaction ratio of the curing agent reacted with the binder in the area between the outer surface of the upper magnetic layer and a position 0.1 μm in depth from the outer surface is 1.3 to 2.2 times as much as the reaction ratio of the curing agent reacted with the total binder in the lower non-magnetic and upper magnetic layers as a whole.

* * * * *